(12) United States Patent  
Peterson

(10) Patent No.: US 8,021,714 B2
(45) Date of Patent: Sep. 20, 2011

(54) FRONT-PROJECTION SCREEN WITH SUBSURFACE DIFFUSION TARGETS

(75) Inventor: Mark D. Peterson, Wilsonville, OR (US)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 12/199,965

(22) Filed: Aug. 28, 2008

(65) Prior Publication Data

US 2008/0314514 A1 Dec. 25, 2008

Related U.S. Application Data

(62) Division of application No. 10/987,983, filed on Nov. 12, 2004, now Pat. No. 7,433,122.

(51) Int. Cl.
*G03B 21/60* (2006.01)
(52) U.S. Cl. .................................... 427/163.3
(58) Field of Classification Search ............... 427/163.3
See application file for complete search history.

(56) References Cited

U.S. PATENT DOCUMENTS

| | | |
|---|---|---|
| 1,942,841 A | 1/1934 | Shimizu |
| 2,991,693 A | 7/1961 | MacNeille |
| 3,191,495 A | 6/1965 | Miller |
| 4,298,246 A | 11/1981 | Iwamura |
| 4,431,266 A | 2/1984 | Mori |
| 5,668,662 A | 9/1997 | Magocs |
| 5,870,224 A | 2/1999 | Saitoh |
| 5,903,399 A | 5/1999 | Yamashita |
| 6,530,664 B2 | 3/2003 | Vanderwerf |
| 6,829,086 B1 * | 12/2004 | Gibilini ..................... 359/453 |
| 7,050,227 B2 | 5/2006 | Olofson |
| 7,072,096 B2 | 7/2006 | Holman |
| 7,102,819 B2 | 9/2006 | Chang |
| 2003/0206342 A1 | 11/2003 | Reed |
| 2004/0017612 A1 | 1/2004 | Fadel |
| 2005/0018285 A1 | 1/2005 | Kubota |
| 2005/0052737 A1 | 3/2005 | Amemiya |
| 2006/0061861 A1 | 3/2006 | Munro |

FOREIGN PATENT DOCUMENTS

JP 6-059341 * 4/1994
WO WO 00/67071 * 11/2000

OTHER PUBLICATIONS

Computer-generated translation of JP 6-059341 (Apr. 1994).*

* cited by examiner

*Primary Examiner* — John A. McPherson
(74) *Attorney, Agent, or Firm* — Kilpatrick Townsend & Stockton LLP

(57) ABSTRACT

An apparatus, system, and method for a front-projection screen having a subsurface diffusion target are disclosed herein.

2 Claims, 5 Drawing Sheets

FRONT-PROJECTION SCREEN WITH SUBSURFACE DIFFUSION TARGETS

RELATED APPLICATION

The present application is a divisional application of U.S. Nonprovisional patent application Ser. No. 10/987,983, filed on 12 Nov. 2004, entitled "FRONT-PROJECTION SCREEN WITH SUBSURFACE DIFFUSION TARGETS," and claims priority to said nonprovisional application. The specification of said nonprovisional application is also hereby fully incorporated by reference in its entirety, except for those sections, if any, that are inconsistent with this specification

FIELD OF THE INVENTION

Embodiments of the invention relate generally to the field of projection screens, and more particularly to a front-projection screen with a subsurface diffuser.

BACKGROUND

Front-projection systems project images from a small display, or light valve, found in a projection device, onto a viewing mechanism. Although the viewing mechanism may be any flat surface, in order to render the detail and contrast found at the light valve over a wide range of viewing angles, a front-projection screen is needed. A high-quality front-projection screen will typically reject a substantial portion of the ambient light surrounding the projection system, while still providing sufficient viewing angles of the projected image.

Current front-projection screens encounter difficulties in selectively providing appropriate rejection and reflection properties to the ambient and image-bearing light, respectively. Additionally, many current front-projection screens employ complex and intricate design features in an attempt to provide the desired properties. These design features inevitably lead to high production costs resulting in expensive resale values and decreased profit margins.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a front-projection screen with subsurface diffusion targets, and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
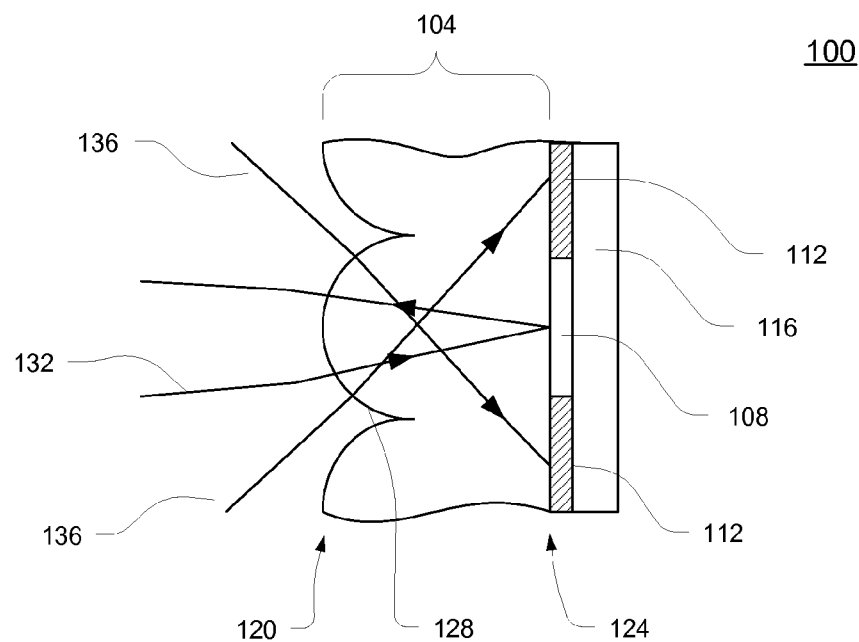
FIG. 1 illustrates a cross-sectional view of a front-projection screen with a subsurface diffusion target, in accordance with another embodiment of the present invention.

FIG. 1 illustrates a cross-sectional view of a projection screen 100 in accordance with an embodiment of the present invention. More particularly, a lens layer 104 may be coupled to a layer that includes a diffusion target 108 and absorption targets 112. A substrate 116 may be coupled to the diffusion target 108 and absorption targets 112 to provide mechanical support for the projection screen 100. Additional support may be provided to the projection screen through a frame or housing (not shown) that is designed to hold the screen 100 in modest tension.

In one embodiment, the lens layer 104 may include a shaped surface 120 and a flat surface 124. The shaped surface 120 may include a pattern of one or more refractive elements, e.g., lenslet 128, formed thereon. The refractive elements may be formed by a refractive element forming device using stamping, rolling, or by any other suitable manufacturing process. In one embodiment, the refractive elements of the lens layer 104 may be cured following formation in order to provide for the desired material properties. In other embodiments, this curing step may not be used. The lens layer 104 may be constructed from materials having suitable mechanical, formable, and optical properties. Such materials could include, but are not limited to, a transparent polymer, glass, or plastic.

The lenslet 128 may be designed to direct projected radiation 132 received within a predetermined range of incident angles towards the diffusion target 108. In one embodiment, the range of incident angles may correspond to a projection angle within which a projection device is adapted to transmit image-bearing light. The diffusion target 108 may be a diffusing, or non-specular, reflector that is designed to scatter radiation as it reflects. After the diffuse reflection, the radiation 132 may exit from the lenslet 128, or neighboring lenslets, with a range of emittance angles that is greater than the range of incident angles. In the context of the projection system embodiment, this may provide for a viewing angle that is greater than the projection angle.

The diffuse reflection of this embodiment may lessen the occurrence of speckle found in prior-art front-projection screens that use bulk diffusion. Bulk diffusion relies on light-scattering particles dispersed throughout a transparent medium. In these prior-art screens speckle in the projected image may result from bundles of light rays traversing the transparent medium without encountering any of the light-scattering particles. This type of speckle may be reduced by the diffuse reflection of the diffusion target 108 of the present embodiment.

The front-projection screen 100 may have a large number of refractive elements on the shaped surface 120 arranged in any number of patterns, whether periodic or random. Additionally, the diffusion target 108 may be one of a number of diffusion targets that are arranged in a pattern to correspond with the pattern of refractive elements on the shaped surface 120. Therefore, each of a number of refractive elements may be aligned with a corresponding diffusion target for radiation received within a desired range of incident angles.

In one embodiment, the pattern of diffusion targets may be printed onto either the flat surface 124 or the substrate 116. A printing mechanism using any one of a number of lithographic or other printing techniques may be used to provide the pattern on the surface. This type of formation may facilitate an inexpensive and reliable way to provide diffusion targets for respective ones of the refractive elements.

The diffusion target 108 could be an opaque coating with a texture sufficient to provide the desired diffuse reflection. In one embodiment, the coating could be a white or an off-white color; however, other embodiments may use other colored diffusion targets to modify the reflected characteristics of the radiation.

A projection device may project images with an overall emission energy imbalance. For example, a high-intensity discharge (HID) arc lamp may provide greater emission energy content at the blue end of the color spectrum than at the red end. In one embodiment, the front-projection screen 100 may be adapted to compensate for such an imbalance. For example, the diffusion target 108 could be adapted to reflect the red end of the spectrum better than the blue end, which could result in less of an overall emission energy imbalance in the viewed image.

Through a printing process similar to the one discussed above, the absorption targets 112 may be printed in a manner to complement the pattern of the diffusion targets. In one embodiment, and as shown in FIG. 1, the absorption targets 112 may be coplanar with the diffusion target 108. The absorption targets 112 may be a black matte coating or material that is adapted to receive and absorb at least a portion of the ambient radiation 136 that is incident upon the refractive elements outside of the desired range of incident angles.

In one embodiment, the surface features of the lenslet 128 may be approximately equal to or less than about 300 microns. This size range may allow for multiple lenslets (e.g., 3-10) to be associated with each pixel of a projected image. This, in turn, could potentially increase the overall visibility of the projected image as well as facilitating the alignment of the projection device and the screen 100. Due to the small scale of the features, the pattern of refractive elements may sometimes be referred to as a microstructure, or a microlens, array.

The diffusing target 108 may be separated from the shaped surface 120 along a similar order of magnitude as the surface features. For example, in one embodiment, the lenslet 128 may have a focal distance that is approximately equal to the distance that the diffusion target 108 is separated from the lenslet 128. A focal distance for a lenslet with surface features less than 300 microns, may be approximately 1 millimeter or less. In one embodiment the shaped surface 120 may be coupled to a transparent layer with the flat surface 124 in order to provide the desired spacing of the lenslet 128 from the diffusing target 108. In other embodiments, the shaped surface 120 may be formed directly onto a material of the desired thickness and the flat surface 124.

Figure 2:
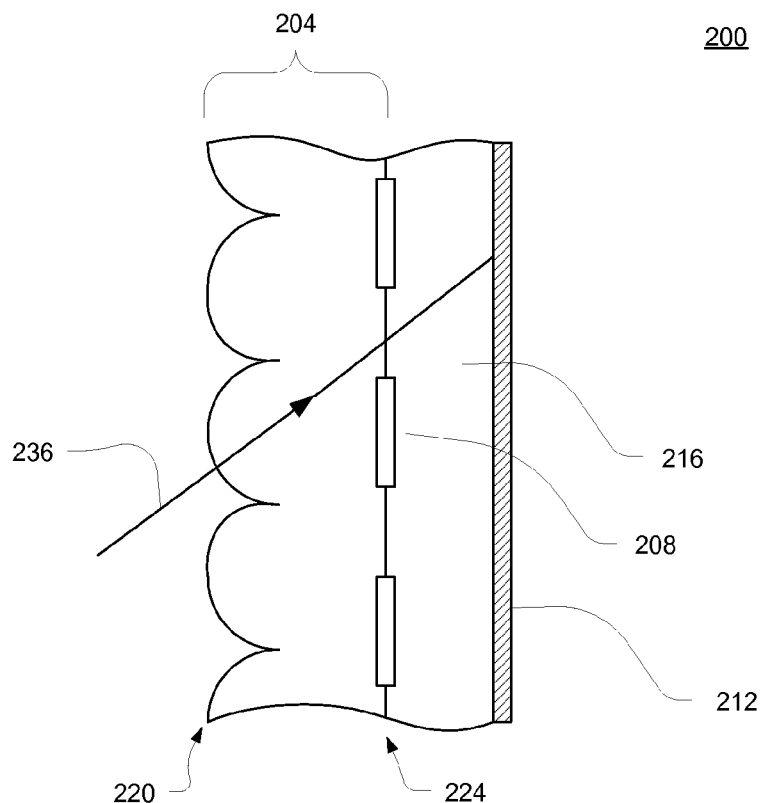
FIG. 2 illustrates a cross-sectional view of a front-projection screen with subsurface diffusion targets and an absorbing back-layer, in accordance with an embodiment of the present invention.

FIG. 2 illustrates a cross-sectional view of a front-projection screen 200 in accordance with an embodiment of the present invention. Similar to the above embodiment, the screen 200 may have a lens layer 204 with a shaped surface 220 and a flat surface 224. Additionally, a number of diffusion targets 208 may be positioned at the flat surface 224. However, in the present embodiment, the screen 200 may have a transparent substrate 216 that is coupled to the flat surface 224 and the diffusion targets 208 at one side, and an absorbing back-layer 212 at a second side.

In this embodiment, the diffusion targets 208 may be coupled between the flat surface 224 and the transparent substrate 216. The absorption layer 212 could be coupled to the backside of the transparent substrate 216. Ambient radiation 236 incident upon the shaped surface 220 outside of the desired range of incident angles, may traverse between the diffusion targets 208, through the transparent substrate 216, and ultimately to the absorbing back-layer 212. Although a good portion of this ambient radiation 236 will be absorbed, a portion may inadvertently be reflected, for example from imperfect transmission through the transparent substrate 216. This inadvertently reflected radiation may still be prevented from emitting from the shaped surface 220 by being blocked by the backside of the diffusion targets 208.

Figure 3:
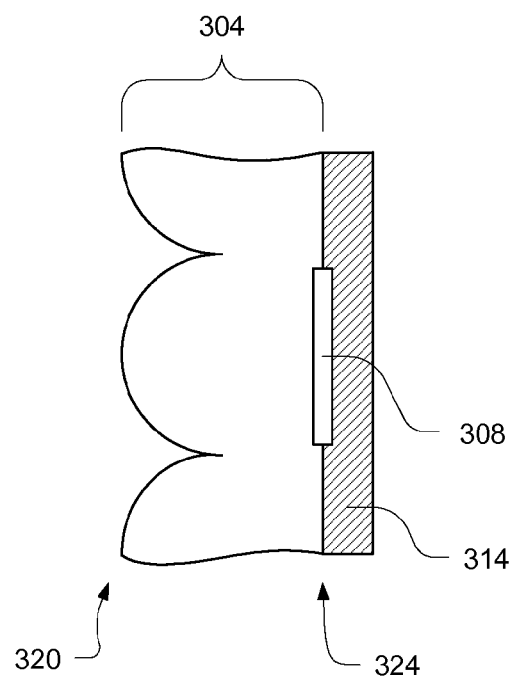
FIG. 3 illustrates a cross-sectional view of a front-projection screen with a diffusing target between a lens layer and an absorbing layer, in accordance with an embodiment of the present invention.

FIG. 3 illustrates a cross-sectional view of a front-projection screen 300 in accordance with an embodiment of the present invention. In this embodiment a lens layer 304 having a shaped surface 320 and a flat surface 324, similar to above embodiments, may be coupled to an absorption substrate 314. A diffusion target 308 may be disposed between the lens layer 304 and the absorption substrate 314. The functionality of the front-projection screen 300 of this embodiment may be similar to above embodiments, with the absorption substrate 314 providing the supporting and absorption characteristics discussed above with reference to the substrate and absorption targets, respectively. In an alternative embodiment, the absorption substrate 314 may function solely as an absorption layer, with a supportive substrate coupled to the backside for mechanical support.

Figure 4:
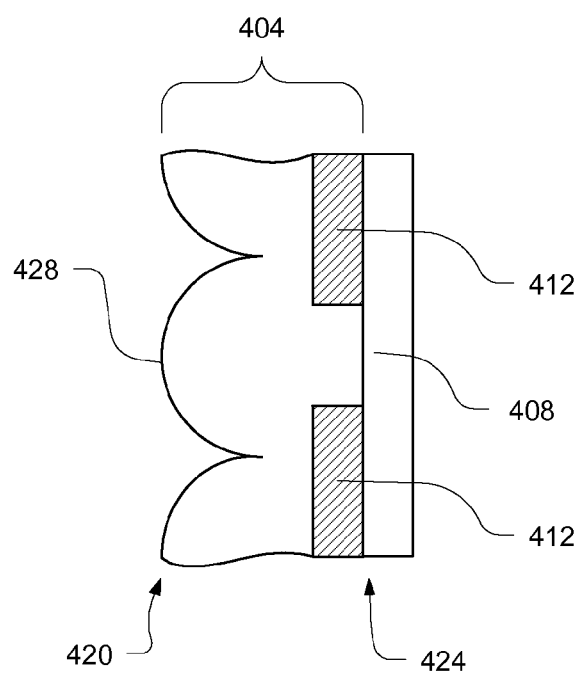
FIG. 4 illustrates a cross-sectional view of a front-projection screen with a lens layer including absorption targets, in accordance with an embodiment of the present invention.

FIG. 4 illustrates a cross-sectional view of a front-projection screen 400 in accordance with an embodiment of the present invention. In this embodiment, a lens layer 404 may include the shaped surface 420 and the flat surface 424, similar to above embodiments; however, in this embodiment the lens layer 404 may also include absorption targets 412. A diffusing target, in the form of a diffusing layer 408 may be laminated to the flat surface 424. In various embodiments, the diffusing layer 408 may provide mechanical support to the screen 400 or, alternatively, a supportive substrate may be coupled to the diffusing layer 408 to provide such support.

Figure 5:
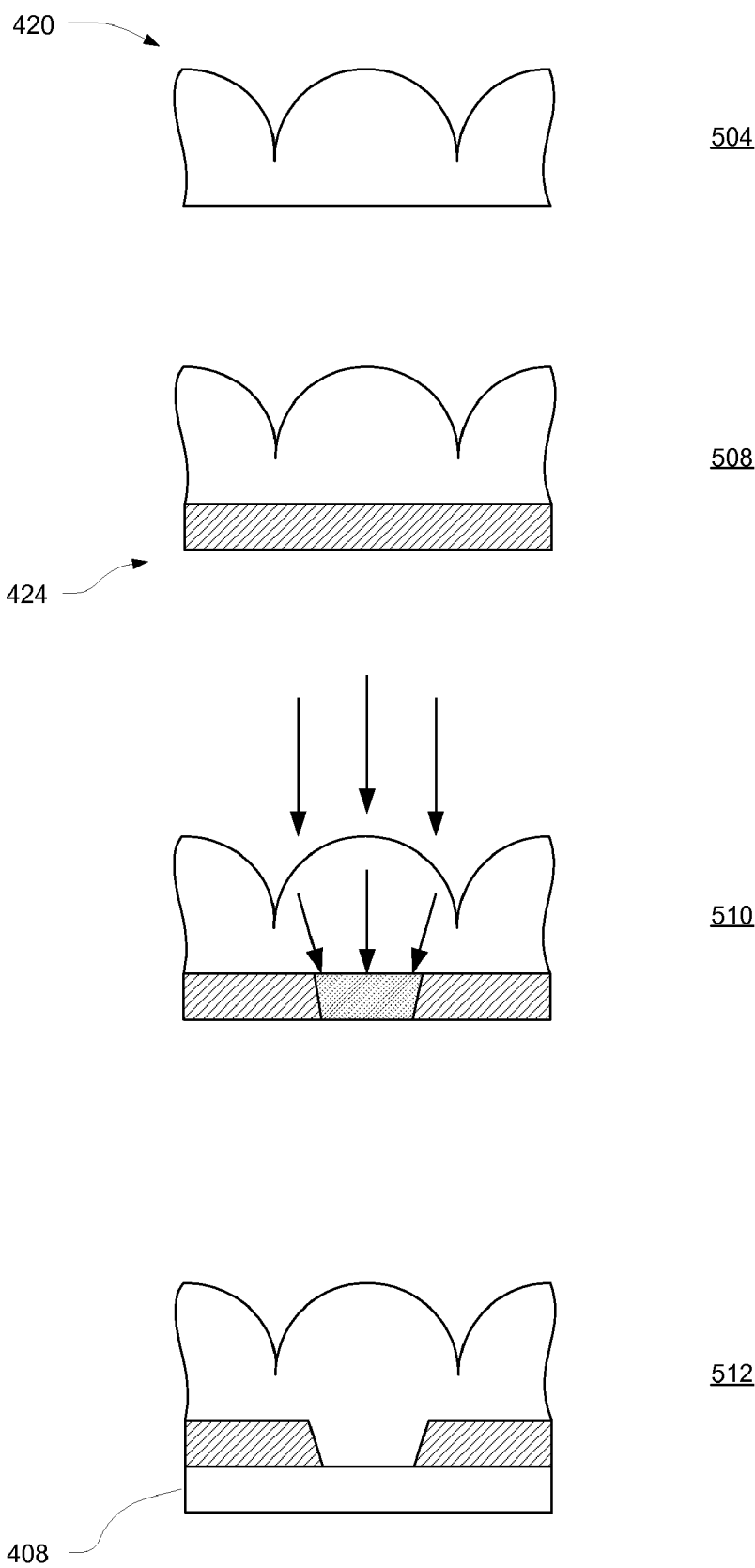
FIG. 5 illustrates cross-sectional views of manufacturing processes capable of producing the front-projection screen of FIG. 4, in accordance with an embodiment of the present invention.

In one embodiment, the absorption targets 412 may become part of the lens layer 404 in manner described with reference to FIG. 5 (the reference numbers in parentheses refer to the process elements). In this embodiment, the shaped surface 420 of the lens layer 404 may be formed into a transparent material (504). An absorption layer, for example, a black photo-plastic layer, having the flat surface 424 on one side, may be coupled with the shaped surface 420 (508). The photo-plastic layer may be of a thickness to provide the flat surface 424 at about the focal point of the refractive elements formed onto the shaped surface 428.

The photo-plastic layer may be a material having absorptive characteristics that, when exposed to radiation, goes through a chemical change (510) to provide a transmissive aperture. In one embodiment, the photo-plastic may be an ablative material that is vaporized upon exposure. In another embodiment, the black photo-plastic material may become clear upon exposure to radiation. In this embodiment, it may be possible to form the entire lens layer 404 out of the photo-plastic material. In various embodiments, the chemical change of the photo-plastic material may be initiated by radiation having characteristics of, e.g., a particular wavelength range and/or intensity, provided to the refractive element by an illumination device capable of reproducing such radiation. The diffusing layer 408 may be laminated to the second surface 424 (512).

By controlling the angles of the exposure radiation that initiates the chemical change of the photo-plastic material, diffuse reflection throughout the range of acceptable projection angles may be facilitated in a self-aligning manner. In one embodiment, exposure radiation may be done within angles of anticipated use, i.e., customized for the geometric dimensions of a particular end-user application. For example, a potential customer may order a customized projection screen by sending along the geometric dimensions of the anticipated arrangement of the projection screen and the projector. At the factory, the relational dimensions may be re-created during the exposure to provide high ambient light rejection in the anticipated arrangement. In other embodiments, projection screens may be developed to accommodate a range of geometric dimensions. In yet another embodiment, some or all of the exposure radiation may be applied at the customer site.

Figure 6:
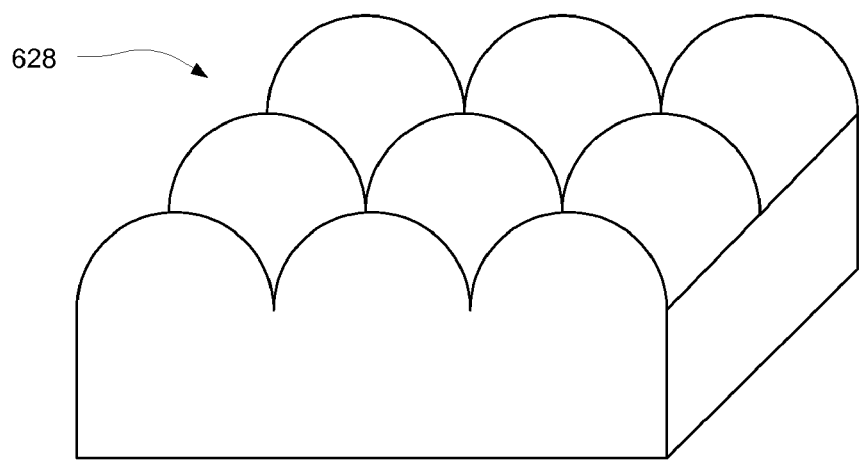
FIG. 6 illustrates a perspective view of a lens layer with an array of refractive elements, in accordance with an embodiment of the present invention.
Figure 7:
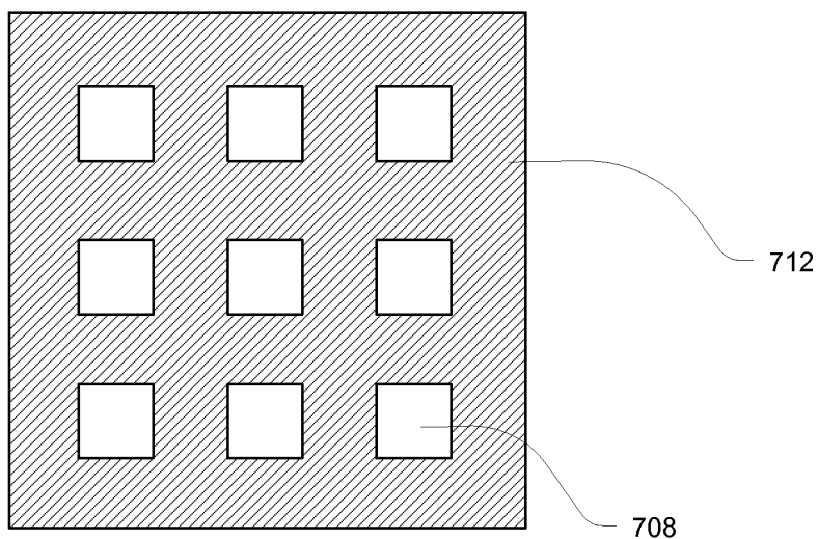
FIG. 7 illustrates a top plan view of a diffusion target pattern, in accordance with an embodiment of the present invention.

In various embodiments, the refractive elements formed in the shaped surface of the screens may come in a wide variety of patterns. For example, FIG. 6 illustrates a lens layer 604 including a pattern of lenslets 628 in accordance with an embodiment of the present invention. As shown in FIG. 6, the lenslets 628 are spherical and arranged in a 3×3 rectangular array. Various embodiments may have any number of lenslets arranged in any number of patterns. The lenslets 628 may be, but are not limited to, convex, ellipsoidal, torodial, aspherical, and polyhedral lenslets. An example of a plan view of a complementary pattern of diffusion targets 708 and absorption targets 712 may be seen in FIG. 7.

In various embodiments refractive elements may include a variety of shapes including, but not limited to, lenslets, lenticules, and prisms. In one embodiment, the choice of the shape and dimensions of the refractive elements may be based on the location of the refractive element in the screen. For example, in one embodiment refractive elements capable of accommodating steep projection angles (e.g., prisms) may be placed along the perimeter of the screen, while other refractive elements (e.g., lenslets) are placed in the center for projection angles closer to orthogonal.

Figure 8:
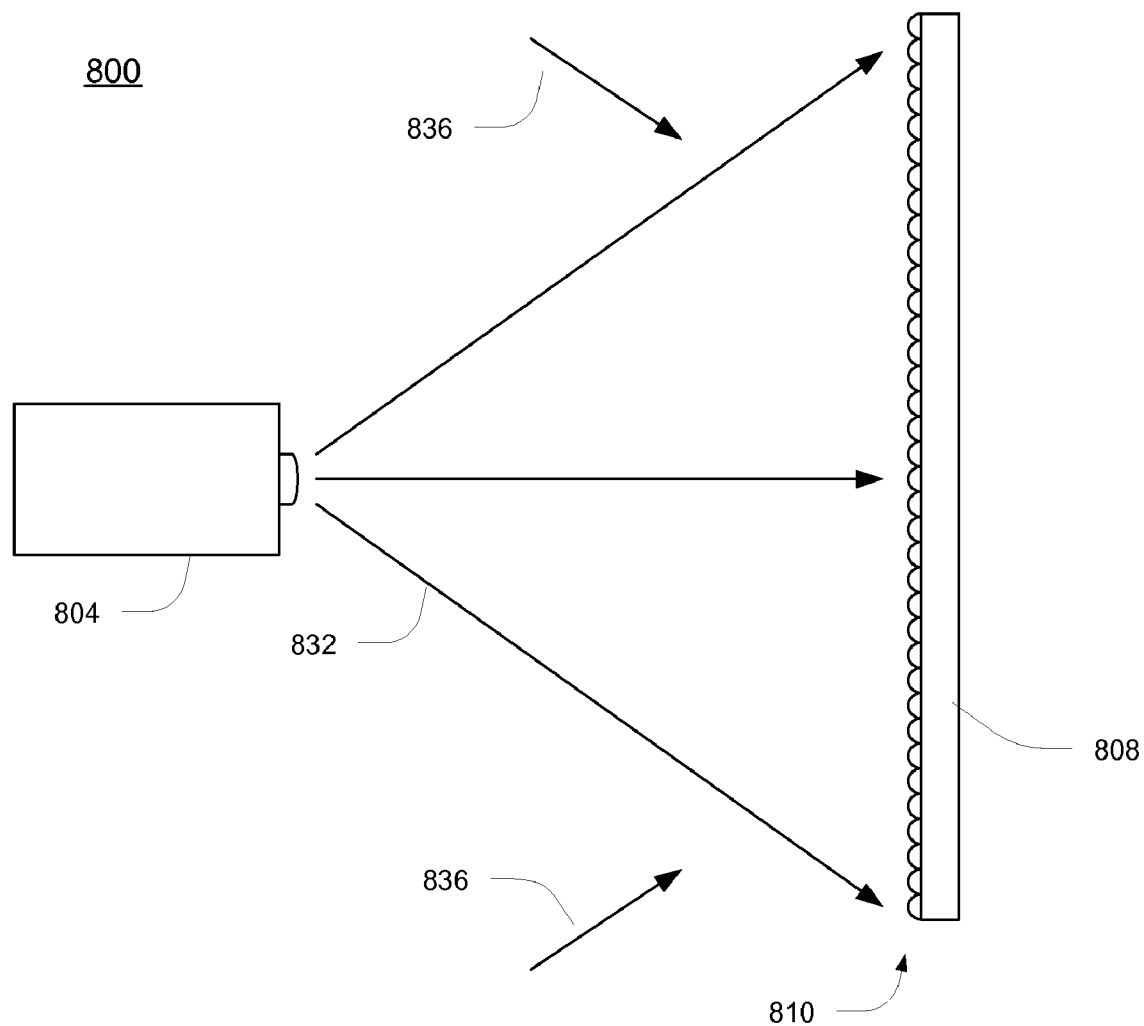
FIG. 8 illustrates a front-projection system, in accordance with an embodiment of the present invention.

FIG. 8 is a simplified block diagram of a front-projection system 800 including a projection device 804 and a screen 808, in accordance with an embodiment of the present invention. In this embodiment the projection device 804 may project an image 832 onto the projection screen 808 for viewing. A lens layer 810 of the projection screen 808 may receive the projected image 832 over a range of projection angles. The screen 808 may reflect the projected image in a manner similar to those described above with reference to FIGS. 1-7. Additionally, the projection screen 808 may absorb, at least a portion, of ambient radiation 836 that is received from the area surrounding the projection device 804. The diffuse reflection of the projected image along with the ambient light absorption may facilitate the rendering of a high-contrast image over a wide viewing angle.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method of forming a front-projection screen comprising:
    forming a refractive element on a first surface of a first layer;
    coupling a first surface of a reflective diffusion target to a location on a second surface of the first layer to receive radiation incident upon the refractive element within a first range of angles;
    coupling a first surface of a transparent substrate to the second surface of the first layer and to a second surface of the reflective diffusion target; and
    coupling an absorption layer to a second surface of the transparent substrate.

2. The method of forming the front-projection screen of claim 1, wherein the coupling of the reflective diffusion target further comprises:
    printing the diffusion target on the second surface of the first layer.

* * * * *